United States Patent [19]

Makinen et al.

[11] Patent Number: 4,648,978

[45] Date of Patent: Mar. 10, 1987

[54] PROCESS FOR THE CONTINUOUS PREPARATION OF STERILE, DEPYROGENATED SOLUTIONS

[75] Inventors: Ralph W. Makinen; James R. Rickloff, both of Erie, Pa.

[73] Assignee: American Sterilizer Company, Erie, Pa.

[21] Appl. No.: 726,422

[22] Filed: Apr. 24, 1985

[51] Int. Cl.$^4$ ............................. C02F 1/78; C02F 1/72
[52] U.S. Cl. ................................. 210/759; 210/760; 210/764; 210/900; 422/28
[58] Field of Search ............... 210/760, 900, 764, 759, 210/763, 757, 192; 422/28

[56] References Cited

U.S. PATENT DOCUMENTS

| | | | |
|---|---|---|---|
| 3,276,458 | 10/1966 | Iversen et al. | 210/900 |
| 3,282,702 | 11/1966 | Schreiner | 210/763 |
| 3,549,528 | 12/1970 | Armstrong | 422/28 |
| 3,870,033 | 3/1975 | Faylor et al. | 210/900 |
| 4,070,289 | 1/1978 | Akcasu | 210/900 |
| 4,548,716 | 10/1985 | Boeve | 210/760 |

OTHER PUBLICATIONS

Dr. Carl Nebel, "Ozone in High Purity Water Systems", Sixth Ozone World Congress Proceedings, International Ozone Association, May 23–26, 1983, Abstract.

Nebel, C. & Nebel, T., "Ozone, the Process Water Sterilant", Pharm. Manuf., Apr., 1984.

Arthur Cherkin, Destruction of Bacterial Endotoxin Pyrogenicity by Hydrogen Peroxide, Immunochemistry, 1975, vol. 12, pp. 625–627.

E. Menczel, A Note on the Depyrogenization of Infusion Solutions by Hydrogen Peroxide.

Abraham Taub and Fanchon Hart, Detoxification of Pyrogens by Hydrogen Peroxide in Some U.S.P. Injections, Journal of the American Pharmaceutical Association, Scientific Edition.

*Primary Examiner*—Benoît Castel
*Attorney, Agent, or Firm*—Robert D. Yeager; Christine R. Ethridge

[57] ABSTRACT

A process for sterilizing and depyrogenating a pretreated solution, such as water, by adding an oxidant selected from the group consisting of hydrogen peroxide and ozone and heating the solution and the oxidant to a temperature sufficient to sterilize and depyrogenate the solution for a period of time, preferably less than 5 minutes. The oxidant is thereafter removed and the sterilized, depyrogenated solution is cooled for dispensing.

14 Claims, No Drawings

PROCESS FOR THE CONTINUOUS PREPARATION OF STERILE, DEPYROGENATED SOLUTIONS

BACKGROUND OF THE INVENTION

1. Field of the Invention

The present invention relates to processes for sterilizing and depyrogenating solutions and, more particularly, to a process for sterilizing and depyrogenating solutions with oxidants.

2. Description of the Prior Art

The United States Pharmacopeia's (USP) official monographs on water states that water for injection, irrigation and inhalation is chemically purified by distillation or reverse osmosis. The water, or any other parenteral solution must be sterile and must contain no more than a specified limit of fever producing pyrogens, or bacterial endotoxin. A maximum level of permissible endotoxin has been set at 0.25 endotoxin units/ml in water used for injection. Further studies have indicated, however, that the maximum of 0.25 EU/ml may be too high for some applications and, have suggested, therefore, that the permissible endotoxin level be determined on a dose basis.

Hospitals at one time prepared purified water for in-house use by distillation. Increasing energy costs and quality control requirements forced many hospitals to abandon the in-house preparation of purified water in favor of purchasing commercially prepackaged solutions. The cost of the prepackaged solutions however, can be prohibitive.

In addition to patient use, purified water is used in the pharmaceutical and microelectronics industries. Bacterial growth can create defects on semiconductors.

Bacterial endotoxin is not completely destroyed by conventional sterilization processes employing heat or filtration. Methods of chemically purifying solutions using two-stage reverse osmosis or reverse osmosis and ultrafiltration have been coupled with membrane filtration or heat to sterilize. Thus, a number of redundant, and costly, back-up systems are required to reduce the endotoxin in solution to acceptable levels. Downstream contamination remains a possibility.

Methods for depyrogenating include heat treatment, hydrolysis with mild acetic acid or mild alkali, treatment with oxidizing agents, acetylation, hydroxylaminolysis, and reductive cleavage by lithium aluminum hydride. Some methods are satisfactory for only simple solutions. Hydrogen peroxide was shown to be an effective agent for the depyrogenation of oxypolygelatin used as a plasma substitute. Its use was extended to the depyrogenation of solutions of sodium chloride and dextrose. See Cherkin, "Destruction of Bacterial Endotoxin Pyrogenicity By Hydrogen Peroxide," 12 IMMUNOCHEMISTRY 625 (1975).

The Cherkin article indicates that the combination of hydrogen peroxide and relatively long exposure to elevated temperatures is effective for depyrogenating batches of pyrogenic solutions. Test batches injected with 0.1M $H_2O_2$ and heated to 100° C. for 1-2 hours were successfully depyrogenated. Later studies confirmed the effectiveness of hydrogen peroxide in rendering water, saline and dextrose solutions nonpyrogenic. For simple solutions, however, manganese dioxide or activated charcoal is required to remove excess peroxide.

A known method for depyrogenating a solution with hydrogen peroxide includes the steps of boiling the hydrogen peroxide-containing solution for fifteen minutes, cooling for five minutes, then boiling for one hour, then cooling to room temperature. Thereafter, an additive for destroying the hydrogen peroxide is introduced into the solution, which is again boiled for fifteen minutes, then cooled for five minutes and finally filtered. Almost two hours is required for each batch. More importantly, the oxidant removal additive can render the solution unacceptable for patient use.

There is a need for a process for rapidly sterilizing and depyrogenating solutions for patient use. There is a further need for such a process which can be used by hospitals to provide a continuous supply of sterilized and depyrogenated solutions at a reasonable cost and without expensive backup systems. Finally, there is a need for such a process in which the depyrogenating agent can be removed without contaminating the solution.

SUMMARY OF THE INVENTION

The present invention provides a process for simultaneously sterilizing and depyrogenating a pretreated solution. The process includes the steps of adding an amount of an oxidant to a stream of the pretreated solution effective for depyrogenating the solution, heating the stream of oxidant-containing solution to a temperature, and for a period of time, sufficient for sterilizing and depyrogenating the solution, and removing the oxidant from the stream of such sterilized, depyrogenated solution.

The solution may be a parenteral solution or water which has been pretreated to remove contaminants. Pretreating may be by distillation, deionization or reverse osmosis. The oxidant is preferably selected from the group consisting of hydrogen peroxide and ozone. The temperature may be within the range of about 212° F. to 300° F., but is preferably between about 250° F. to 270° F. The period of time required for heating may be less than 10 minutes but is preferably between 3 to 5 minutes.

When ozone is used as the oxidant, an 8% concentration by weight ozone/oxygen mixture is bubbled into the stream of solution. The dissolved ozone concentration is about 10 mg per liter of solution. When hydrogen peroxide is used as the oxidant, about 100 mg of hydrogen peroxide per liter of solution is added.

The heating step is preferably achieved by passing the stream of solution and oxidant through a heat exchanger.

DETAILED DESCRIPTION OF THE PREFERRED EMBODIMENT

A continuous supply of sterilized and depyrogenated solutions for patient use can be provided by use of the process of the present invention. The process is particularly well suited for providing an inexpensive in-house supply of purified, depyrogenated sterile water for hospitals.

The water, or other solution of interest, should be treated before use in the sterilizing and depyrogenating process to remove any contaminants therefrom. The terms "pretreated solution" or "pretreated water" as used herein shall mean a solution or water which has been subjected to distillation, deionization, reverse osmosis or any other suitable known treatment process for removing contaminants. USP standards require that water for patient use, and in particular, for injection or irrigation, be pretreated.

An effective amount of an oxidant, preferably hydrogen peroxide or ozone, is added to a stream of pretreated solution. The amount of oxidant must be effective for depyrogenating the quantity of solution to which it is added.

The stream of oxidant-containing solution is then heated to a temperature and for a period of time sufficient to sterilize and depyrogenate the solution. The oxidant is thereafter, preferably, removed, and the sterilized, depyrogenated solution is ready to be aseptically dispensed in a desired manner.

Ozone is known as a sterilant but, heretofore, has apparently never been used to depyrogenate solutions. Hydrogen peroxide has been used both as a sterilant and to depyrogenate but the prior art methods require long time periods. For sterilizing and depyrogenating water by the process of the present invention, ozone and hydrogen peroxide are the preferred oxidants because they can ultimately be broken down into water and oxygen. Any hydroxyl radicals formed in the breakdown are apparently immediately converted back to hydrogen peroxide or water and oxygen. Thus, no potentially contaminating oxidants or oxidant destruction additives are required. Ozone appears to be the more aggressive oxidant of the two.

A method for removing such oxidants from solutions is described in our co-pending U.S. patent application Ser. No. 726,638, "Method for Catalytically Destroying Oxidants In Solution" filed together herewith, and hereby incorporated herein by reference.

Preliminary trial runs using 10 mg/L ozone in distilled water at 250° F. to depyrogenate the water inactivated the endotoxin. Flasks holding 500 ml distilled water were placed in a 20"×20"×38" gravity sterilizer for six minutes until the temperature reached 250° F. In a control flask having an initial endotoxin concentration of 140 EU/ml, sterilizing temperatures alone produced only a 68% reduction in endotoxin. The addition of 10 mg/L $O_3$ under the identical conditions yielded a 98.5% reduction in endotoxin. The addition of 10 mg/L $O_3$ to water having an initial endotoxin concentration of 1400 EU/ml and heated to 250° F. for six minutes yielded a 97.6% reduction in endotoxin.

TABLE I

| ENDOTOXIN INACTIVATION BY OZONE AT 250° F. | | |
|---|---|---|
| Initial Endotoxin (EU/ml) | $O_3$ (mg/L) | % Reduction in Endotoxin |
| 140 | 0 | 68.0 |
| 140 | 10 | 98.5 |
| 1400 | 10 | 97.6 |

The test conditions used in the preliminary tests were less than ideal for keeping $O_3$ in solution. Ozone tends to be converted to $O_2$ under the test conditions.

In further trial runs, *Escherichia coli* endotoxin was inactivated by 10 mg/L $O_3$ at 270° F. The initial endotoxin concentration was approximately 300 Eu/ml.

TABLE II

| INACTIVATION OF *E. coli* ENDOTOXIN BY 10 mg/L $O_3$ at 270° F. | |
|---|---|
| CONTACT TIME (MIN) AT 270° F. | % REDUCTION IN ENDOTOXIN |
| 1 | 96.6 |
| 2 | 98.7 |
| 4 | 99.9 |

TABLE II-continued

| INACTIVATION OF *E. coli* ENDOTOXIN BY 10 mg/L $O_3$ at 270° F. | |
|---|---|
| CONTACT TIME (MIN) AT 270° F. | % REDUCTION IN ENDOTOXIN |
| 8 | 99.98 |

Similar tests were run using 100 mg/L hydrogen peroxide at 270° F. The initial endotoxin concentration was approximately 2600 EU/ml.

TABLE III

| INACTIVIATION OF *E. coli* ENDOTOXIN BY 100 mg/L $H_2O_2$ AT 270° F. | |
|---|---|
| CONTACT TIME (MIN) | % REDUCTION IN ENDOTOXIN |
| 2 | 99.62 |
| 4 | 99.978 |
| 8 | >99.998 |
| 16 | >99.998 |

The simultaneous sterilization and depyrogenation employed in this process breaks down the endotoxin enough to inactivate it. The heat required for sterilization permits the depyrogenation reaction to proceed much more rapidly than was possible in prior art processes. The one to two hour processing time required to sterilize and depyrogenate in prior art systems is reduced to less than five minutes using the process of the present invention.

Although heat tends to destroy ozone and hydrogen peroxide the short reaction time permits the oxidants to inactivate the endotoxin before being destroyed.

In a preferred embodiment, 8% gaseous ozone (concentration by weight) is bubbled into a stream of pretreated water. Preferably, a self contained system having the capacity to continuously deliver the pretreated water through suitable piping to a point at which the oxidant is added would be used. The ozone may be bubbled into the stream or added with a static mixer. Any other suitable known means for adding the oxidant can be used, provided that an effective dissolved ozone concentration is achieved. A concentration of approximately 10 mg/L has been found to be effective.

The ozonated water is then passed through a heat exchanger to elevate the temperature to that sufficient for sterilization. The temperature for water should be between about 212° F. to 300° F. A range of between about 250° F. to 270° F. is preferred. The optimum temperature is 270° F. In place of a heat exchanger, any other suitable known means of raising the temperature to the desired level within the desired time frame will suffice.

When hydrogen peroxide is used as the oxidant, the solution can be heated before or after the addition of the oxidant. When ozone is used, the solution should be heated after the oxidant is added. The addition of oxidant and the heating process can, in some instances, occur almost simultaneously.

The total exposure time in the preferred embodiment of the process is about from 3-5 minutes. When ozone is used as the oxidant, it is broken down by the heat of the system into oxygen. A debubbler can be used to remove the $O_2$. To ensure absolute removal of the ozone, and to adapt the system for use with other oxidants which are not as readily broken down, an oxidant removal step is preferred. If any residual peroxide remains after the oxidant removal step, the small quantities of oxygen produced from the residual peroxide are too small to form an actual bubble, and, under the worst conditions, assuming the unlikely event of instantaneous injection of the solution into a patient, would be absorbed by hemoglobin.

Following the heating of the stream of solution to sterilize and depyrogenate the solution, the heated solution is passed through an in-line member made of a pourous metal alloy, or material known to catalytically destroy the particular oxidant but which will not be dissolved by the oxidant. The member, which may be a filter, a frit or any suitable sintered element should have a surface area and pore size sufficient to ensure adequate contact between the oxidant and the catalytic material. Monel filters having a relatively small pore size, for example, 7 um or a Hastelloy C filters have been used successfully to breakdown hydrogen peroxide into water and oxygen. Metallic sintered frits are preferred, but, depending on the oxidant used, other materials compatable for use with patients, in parenteral solutions, food stuff or other specific end use applications, may be satisfactory.

Following removal of the oxidant, the sterile, depyrogenated solution should be cooled to a predetermined temperature suitable for dispensing. The solution can be dispensed, in any suitable aseptic manner, into a container or directly to the patient. If purified water is dispensed into containers, it should be cooled to below 212° F. to avoid "flashing" the solution to steam. The water can be cooled further while in the containers to guarantee the sterility of the container.

The parameters of the process such as the water temperature and the amount of ozone generated, can be easily monitored to provide a continuous assurance of product quality. The incorporation of this process into a continuous flow system provides a continuous and relatively inexpensive supply of sterile, depyrogenated solutions. If desired, the process can also be operated in a batch mode.

What is claimed is:

1. A sterilizing and depyrogenating process comprising the steps of:
    treating a stream of a solution to remove contaminants therefrom;
    adding a discrete amount of an oxidant selected from the group consisting of hydrogen peroxide and ozone to said stream of treated solution;
    heating said stream of such treated solution and said oxidant to a temperature in the range of about 212° F. to 300° F. and for a period of time less than about ten minutes sufficient to simultaneously sterilize and depyrogenate such treated solution while said solution is being heated, said amount of oxidant added to said stream of solution being effective, when said stream of solution and said oxidant are heated to said temperature, to depyrogenate said solution; and
    removing any residual of said oxidant from said stream of such treated, sterilized, depyrogenated solution.

2. A process as recited in claim 1 wherein said solution is a parenteral solution.

3. A process as recited in claim 1 wherein said amount of said oxidant is about 100 mg of hydrogen peroxide per liter of said solution.

4. A process as recited in claim 1 wherein said oxidant is about 8% ozone by weight bubbled into said stream of such treated solution.

5. A process as recited in claim 4 wherein said amount is about 10 mg of ozone per liter of said solution.

6. A process as recited in claim 1 wherein said heating step comprises passing said stream of such treated solution and said oxidant through a heat exchanger.

7. A process as recited in claim 1 wherein said removing step includes catalytically destroying said oxidant.

8. A process as recited in claim 1 wherein said temperature is in the range of about 250° F. to 270° F.

9. A process as recited in claim 1 wherein said period of time is less than about 5 minutes.

10. A process for the sterilization and depyrogenation of pretreated water comprising the steps of:
    bubbling a discrete amount of ozone into a stream of said water and heating said stream of water and said ozone to a temperature within the range of about 250° F. to 270° F. for a period of time less than about ten minutes sufficient to simultaneously sterilize and depyrogenate said water while said water is being heated, said amount of ozone bubbled into said stream of water being effective, when said stream of water and said ozone are heated to said temperature, to depyrogenate said water.

11. A process as recited in claim 10 wherein said amount of ozone is about 10 mg of ozone per liter in said water.

12. A process as recited in claim 10 wherein said period of time is less than 5 minutes.

13. A process as recited in claim 10 wherein said period of time is about 3 to 5 minutes.

14. A process as recited in claim 10 wherein said heating step includes passing said stream of water and ozone through a heat exchanger.

* * * * *